R. H. HELSEL.
TICKET ISSUING MACHINE.
APPLICATION FILED JAN. 21, 1921.

1,435,231.

Patented Nov. 14, 1922.
6 SHEETS—SHEET 1.

INVENTOR
Reuben H. Helsel
BY
ATTORNEY

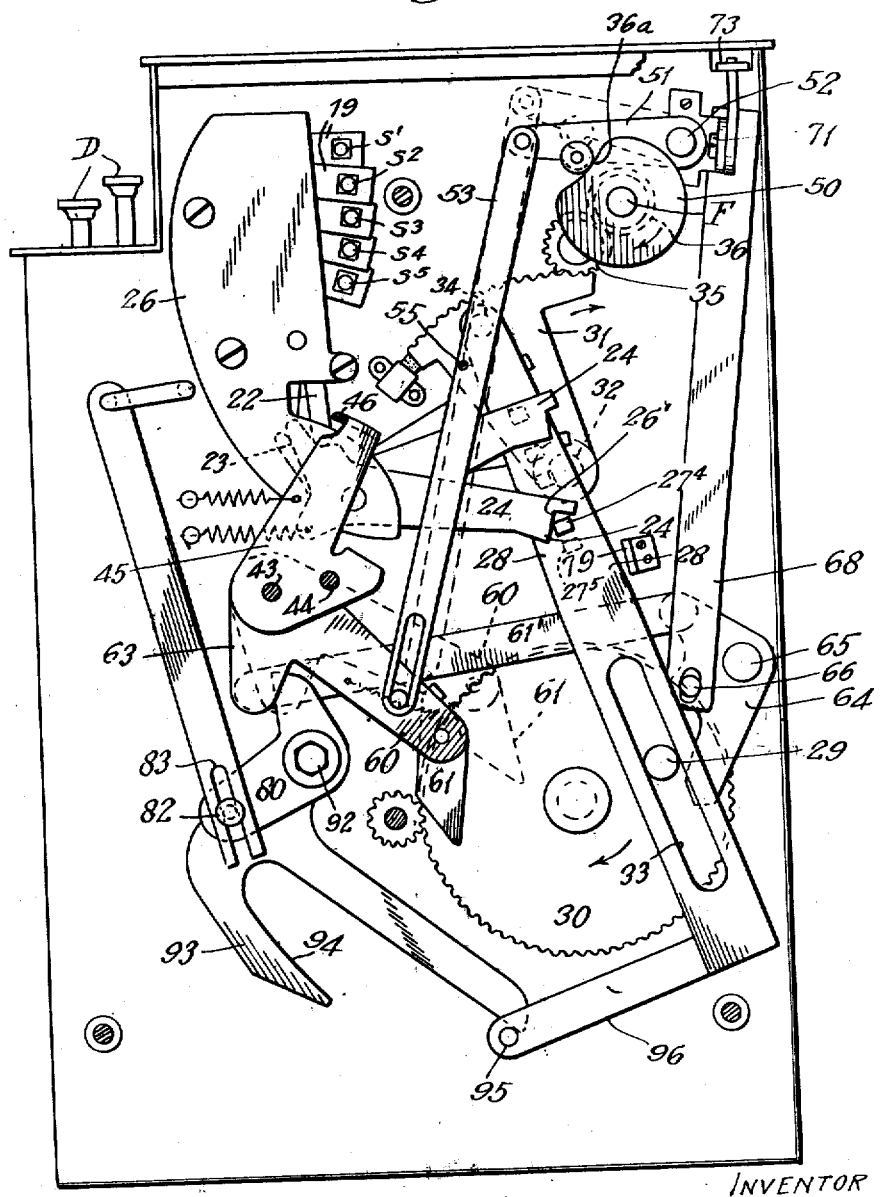

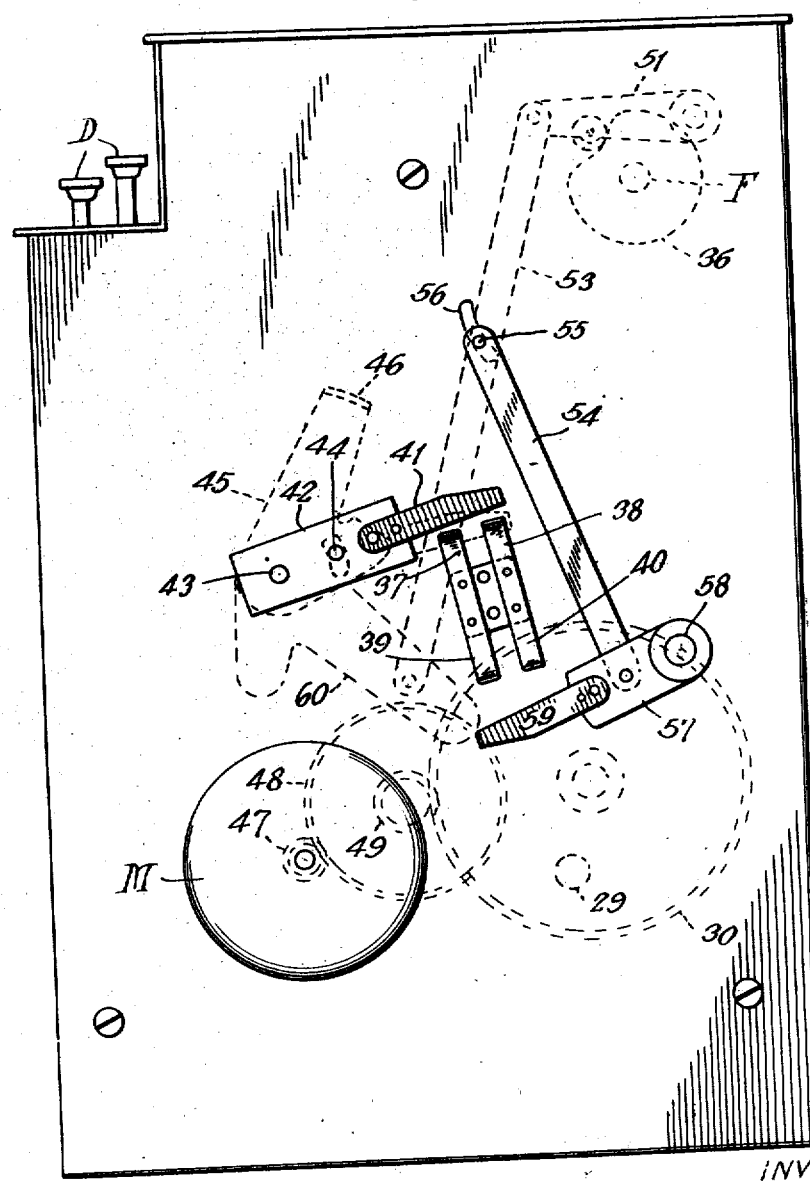

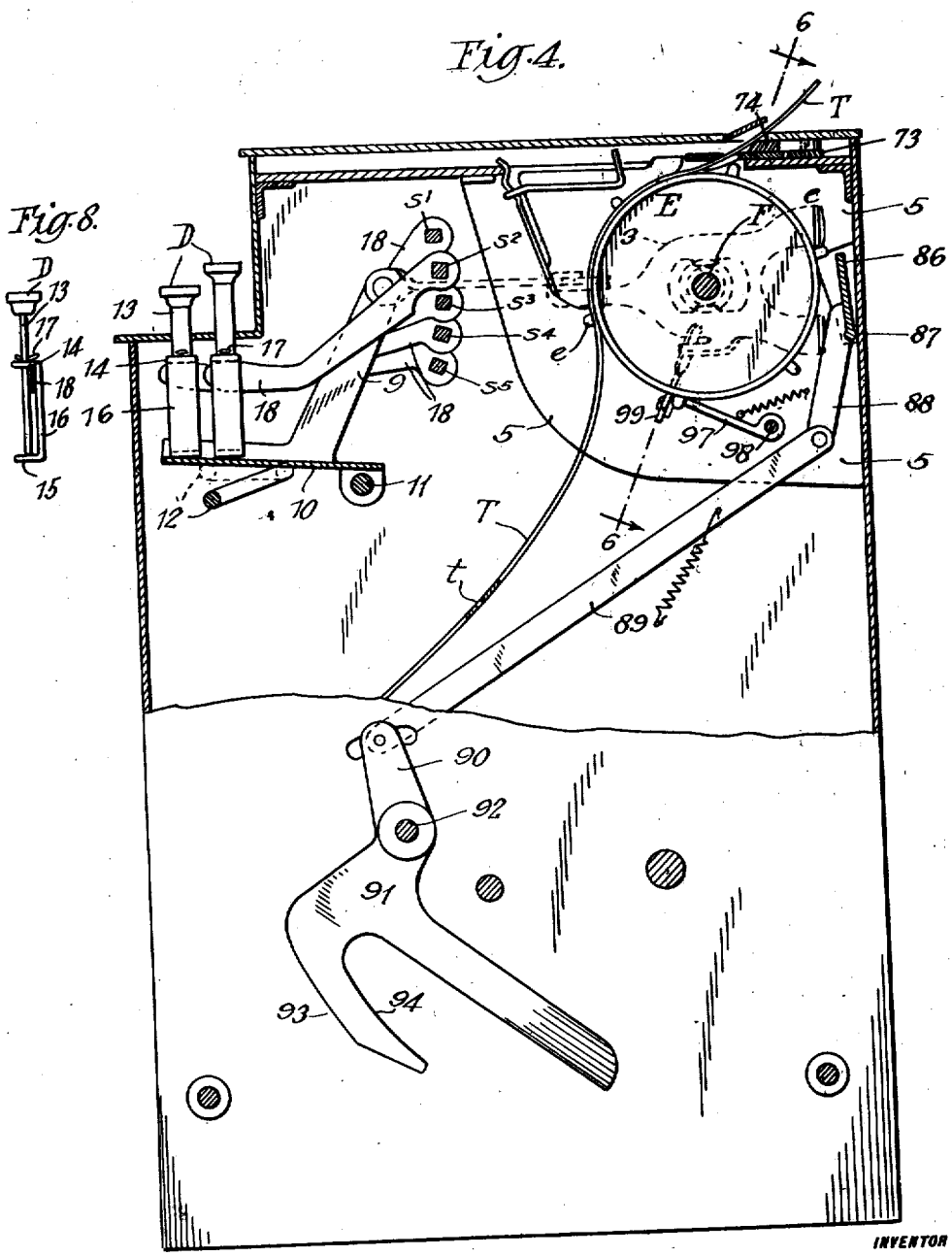

R. H. HELSEL.
TICKET ISSUING MACHINE.
APPLICATION FILED JAN. 21, 1921.

1,435,231.

Patented Nov. 14, 1922.
6 SHEETS—SHEET 5.

INVENTOR
Reuben H. Helsel
BY
ATTORNEY

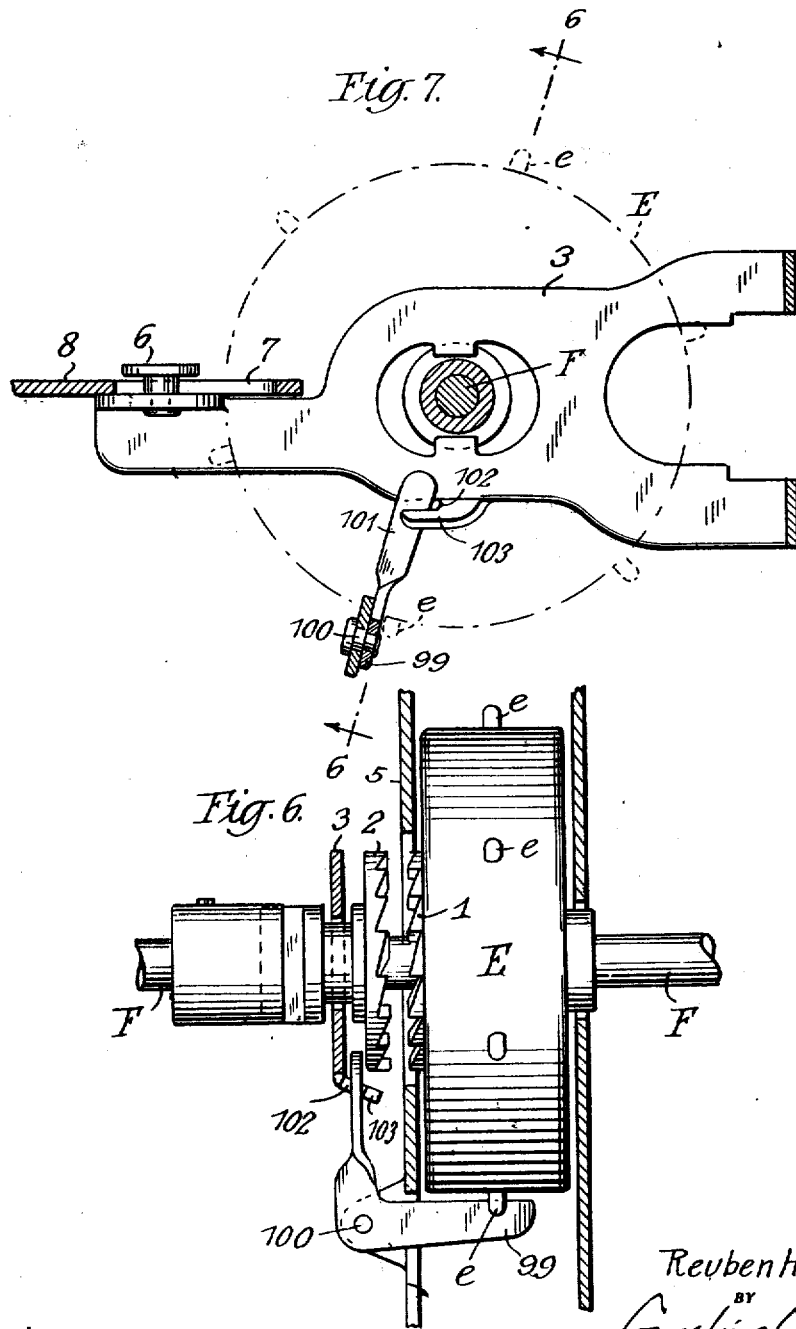

Patented Nov. 14, 1922.

1,435,231

UNITED STATES PATENT OFFICE.

REUBEN H. HELSEL, OF LONG ISLAND CITY, NEW YORK, ASSIGNOR, BY MESNE ASSIGNMENTS, TO AUTOMATIC TICKET REGISTER CORPORATION, OF NEW YORK, N. Y., A CORPORATION OF NEW YORK.

TICKET-ISSUING MACHINE.

Application filed January 21, 1921. Serial No. 438,961.

*To all whom it may concern:*

Be it known that I, REUBEN H. HELSEL, a citizen of the United States, and a resident of Long Island City, Queens County, New York, have invented certain new and useful Improvements in a Ticket-Issuing Machine, of which the following is a specification.

This invention relates to a machine for automatically delivering a selected number of tickets of different denominations under the control of an operator. Broadly, the machine comprises a plurality of ticket feeding drums with groups of keys corresponding to each feed drum. Each feed drum is adapted to feed tickets of different denominations and the keys in each group selectively govern the number of tickets to be issued by the drum of the corresponding group. The several drums are driven from a common driving member and the different groups of keys provide selecting mechanism whereby tickets of different denominations can be issued in different quantities by the common driving mechanism.

The objects and advantages of my improved construction will be apparent as the description proceeds and the novel features pointed out in the appended claims.

Referring to the drawings:

Fig. 1 is a vertical section substantially on line 1—1 of Fig. 5, showing the driving mechanism which is common to the several units. In this view the parts are in the position they assume when the machine is idle.

Fig. 1ª is a detail of parts shown in Fig. 1.

Fig. 2 is a similar view on line 2—2 of Fig. 5 showing certain of the parts in the position they assume after a key has been depressed and the main driving gear has partially rotated.

Fig. 3 is a vertical side elevation of the device showing the motor.

Fig. 4 is a vertical section on line 4—4 of Fig. 5 showing one of the feed drums and key actuated mechanism for engaging said drum with its drum shaft.

Fig. 6 is a detail view on line 6—6 of Figs. 4 and 7.

Fig. 7 is a detail view of parts shown in Fig. 4.

Fig. 8 is a detail view of one of the selector keys.

Figure 5:
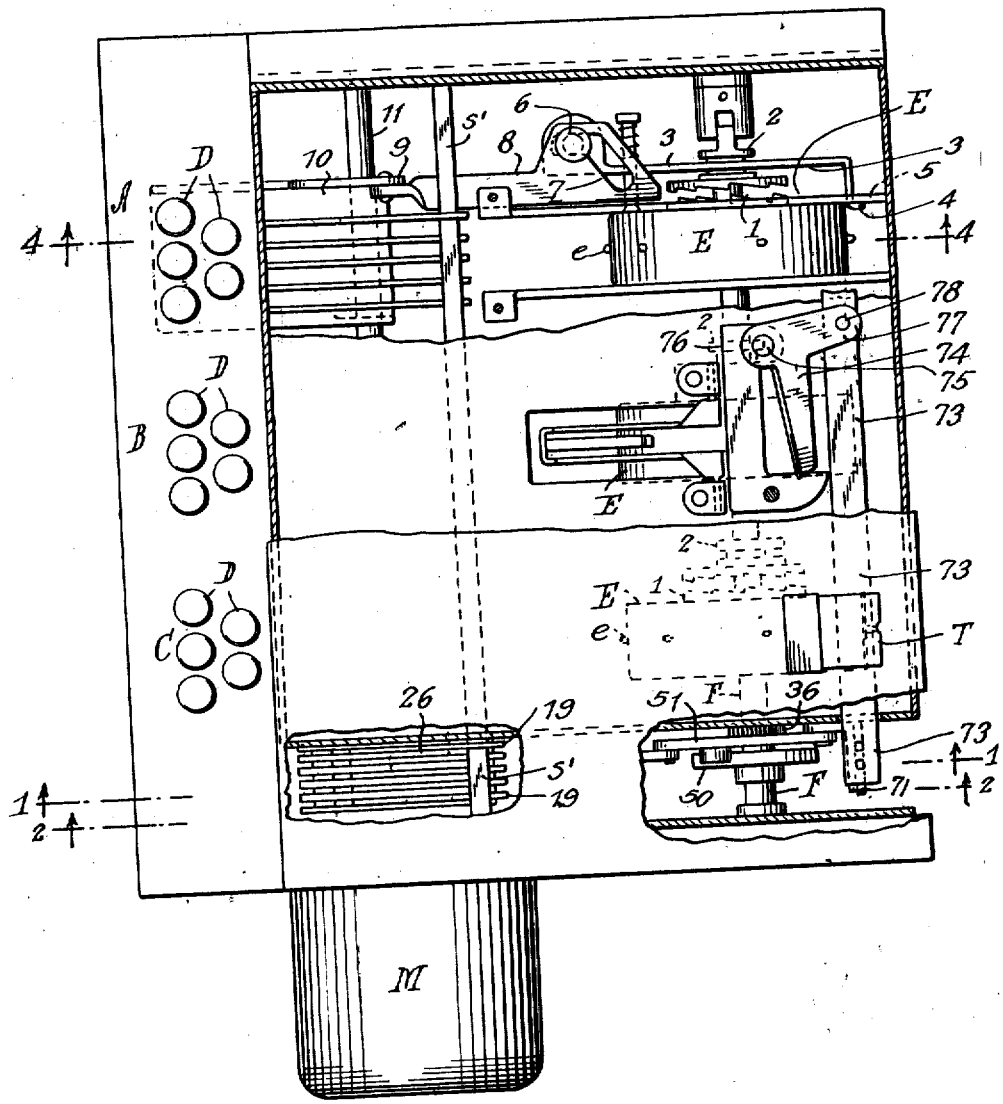
Fig. 5 is a plan view with parts broken away in successive planes to reveal a different portion of the mechanism in each of the three units shown.

Referring first to Figs. 4 and 5 the machine comprises a plurality of units each of which is capable of delivering from one to five tickets, in the embodiment shown, of a determined denomination. For example, the unit A delivers ten-cent tickets, unit B twenty-five cent tickets and the unit C fifty cent tickets. The keys D, determine the number of tickets to be issued by the feed drum E.

The drum E in each of the units is the same and the key mechanism co-operating therewith is also the same, and therefore a description of one will suffice for all.

The several drums are loosely mounted on a transversely extending drum shaft F and are each provided with clutch jaws which are adapted to co-operate with similar jaws on a clutch 2 which rotates with the drum shaft F being capable of longitudinal movement thereon. The clutch 2 is moved into and out of engagement with the drum E by a clutch lever 3 pivoted at 4 to a fixed partition wall 5 shown in Figs. 4 and 5. The lever 3 has a stud 6 secured to its free end, which passes through a cam slot 7 formed in a slide 8, which is reciprocated by an arm 9 extending upwardly from a plate 10 pivoted on a fixed bar 11. The plate 10 is normally held in the raised position shown in Fig. 4 by a swinging bale 12 located beneath the plate 10. There is a separate plate 10 and corresponding arm for each drum and any one of the keys D of a given group is capable of depressing this plate and therefore engaging the clutch 2 with the corresponding drum. The keys D each have a shank 13 which passes through flanges 14 and 15 in a yoke shaped strip 16 and the ends of said strips 16 rest on the top surface of the plate 10. A cotter-pin 17 passes through the shank 13 and serves to force the strip 16 down when the key is depressed. The flanges 14 of the strip 16 each engage the end of a lever 18 carried by one of the shafts $S^1, S^2, S^3, S^4, S^5$. These several shafts determine the number of tickets to be fed by the drum E, it being understood that each of the shafts $S^1$ to $S^5$ inclusive carries a lever 18 which is actuated by a different key D which may be marked with the numerals 1 to 5 inclusive to enable the operator to depress the proper key to deliver the number of tickets required.

The shafts $S^1$ to $S^5$ inclusive can be rocked by any of the keys in groups A, B or C and are therefore capable of controlling the number of tickets issued by any unit. These shafts extend through to the driving section of the machine shown in Fig. 1 and each of said shafts carry in that section an arm 19 which engages a rack 20 arranged to oscillate a sector 21, having a downwardly extending finger 22 which engage a tail 23 of a swinging stop 24 which is pivoted at 25 to fixed frame plates 26.

The outer end of each stop is notched, as at 26', to co-operate respectively with fulcrum pins $27^5$ carried on a link 28 which forms a connecting element between a driving pin 29 secured to a main driving gear 30 and a swinging sector 31 pivoted at 32 to a fixed part of the machine. This connecting element is slotted at 33 for co-operation with the pin 29 and is pivoted on a stud 34 secured in the sector 31.

There are five of the swinging stops 24 and five of the fulcrum pins 27 adapted to co-operate therewith. The several swinging stops and fulcrum pins correspond to the shafts $S^1$ to $S^5$ inclusive.

When the machine is at rest the fulcrum pins 27 are so positioned relatively to the swinging stops 24 that the link 28 can move past the swinging stops without any of the fulcrum pins 27 engaging the notches 26 of the swinging stops. When a key is depressed, however, the relation of the parts will be changed. As shown in Fig. 2, the number 4 key has been depressed, bringing one of the swinging stops 24 into position to be engaged by a fulcrum pin $27^4$ carried on the connecting element 28. In this figure the pin 29 has rotated clockwise about three fourths of a revolution from the position shown in Fig. 1. This movement will swing the link 28 on its pivot 34 to the position shown in Fig. 2, in which the fulcrum pin 27 is in position to engage the notched end 26' of the swinging stop 24. It is to be noted that the depression of the key caused the finger 22 to swing counterclockwise and permit the spring $24^a$ to pull the stop 24 to the position shown in Fig. 2. The sector 31 meshes with an idler 35 which engages a gear 36 secured to the drum shaft F. As the main drive gear rotates its pin 29 will drive the sector 31 through different angular distances according to which one of the swinging stops 24 is selected, it being understood the varying distances between the pivotal center of the link 34 and the center of the fulcrum pins 27 will vary the amount of motion transmitted by said link 28 to the sector 31. In the drawing the foremost stop shown is the one corresponding to the number 4 key and therefore the stroke of the sector 31, with the parts in the position of Fig. 2, will be sufficient to rotate the drum E through an angular distance sufficient to issue four tickets. Had the number 1 key been selected for example, the stop 24 would have been positioned to co-operate with the lug marked 27' and a correspondingly smaller motion would be transmitted by the link 28 to the sector 31, in this instance just sufficient to rotate the drum through one sixth of a revolution to issue one ticket. In a similar way any one of the keys from 1 to 5 inclusive is capable of swinging its corresponding stop 24 into position for engagement with the several stops 27', $27^2$, $27^3$, $27^4$, $27^5$.

Novel means are provided for controlling the circuit of the motor M which transmits motion to the feed drums through the main drive gear 30, sector 31 and associated apparatus above described. These means include a switch having two sets of contacts, the first set comprising jaws 37 and 38, and the second set comprising jaws 39 and 40. Conductors, not shown, are connected with the switch jaws, and when the circuit is closed across either set of contacts, the motor will be started. A swinging contact 41 carried by a block 42, pivoted at 43, is adapted to close the circuit across the contacts 37 and 38 to initially start the motor. The block 42 is turned on its center by a pin 44, Figs. 2 and 3, secured thereto and also connected with a lever 45, having a downwardly projecting lip 46 adapted to be actuated by any one of the five key actuated fingers 22 above described, so that whenever a key is depressed the lever 45 will be swung clockwise to close the circuit across the contacts 37 and 38 and thereby start the motor. After the motor starts it will rotate the main drive gear 30 through the gears 47, 48 and 49, indicated in Fig. 3. The main drive gear 30 thus rotated will swing the link 28 over to the position shown in Fig. 2 and further movement of this gear will cause said link to fulcrum on the pin $27^4$ and transmit motion to the drum shaft F through sector 31 and gears 35 and 36. This will cause a cam 50 carried on shaft F to lift a lever 51, pivoted at 52, and cause said lever to raise a link 53 secured to the free end thereof. This latter movement performs a number of important setting functions, one of which is to lift a link 54 connected to the link 53 by a pin 55 passing through a slot 56 in a side plate of the machine. The lower end of the link 54 is connected with a second swinging contact arm 57 pivoted at 58 and carrying a switch blade 59 arranged for co-action with the switch jaws 39 and 40. When the cam 36 rotates it closes the circuit across said second set of switch jaws 39 and 40 and holds the motor circuit closed until after the drum has issued its ticket or tickets, it being understood that after the drum has issued the tickets, the cam 36 returns to the position shown in Fig. 1 in which the notch 36ᵃ comes under the roller carried by the lever 51. The link 53 also swings a kick-off lever 60 upward to the dotted position shown in Fig. 2. This kick-off lever has pivotally mounted on one end a spring-retracted dog 61 adapted to be engaged by the eccentric pin 29 carried on the main drive gear 30.

When the kick-off lever 60 is in the dotted position shown in Fig. 2, the dog 61 will be in the path of the eccentric pin 29, and as the latter strikes it, it will swing said kick-off lever 60 counter-clockwise and cause it to move a connecting link 61' which is connected at 62 to an arm 63 on said kick-off lever. This movement is imparted to a bell crank 64, pivoted at 65, to a fixed plate on the machine. The bell crank 64 carries a pin 66, which engages a slot 67 in a bar 68, having rack teeth 69 formed on the upper end thereof for engagement with a sector 70, pivoted at 71, to a fixed bracket 72. The sector 70 carries an arm 71, having teeth which are adapted to reciprocate a bar 73. This bar extends transversely across the top of the machine and actuates the knife 74, shown in Fig. 5, used to shear the issued tickets. The knife 74 is pivoted at 75 to a bracket 76 and has an arm 77, engaging a pin 78, which pin is carried by the bar 73. As thus arranged it is clear that when the crank pin 29 strikes the kick-off lever 60, the bar 73 will be reciprocated through the connections above described and a cutting movement will be transmitted to the knife 74. While only one knife is shown in the drawing, it is to be understood there is a knife corresponding to each of the units A, B and C, and the several knives are all actuated by the one reciprocating bar 73.

Figures 1, 1A:
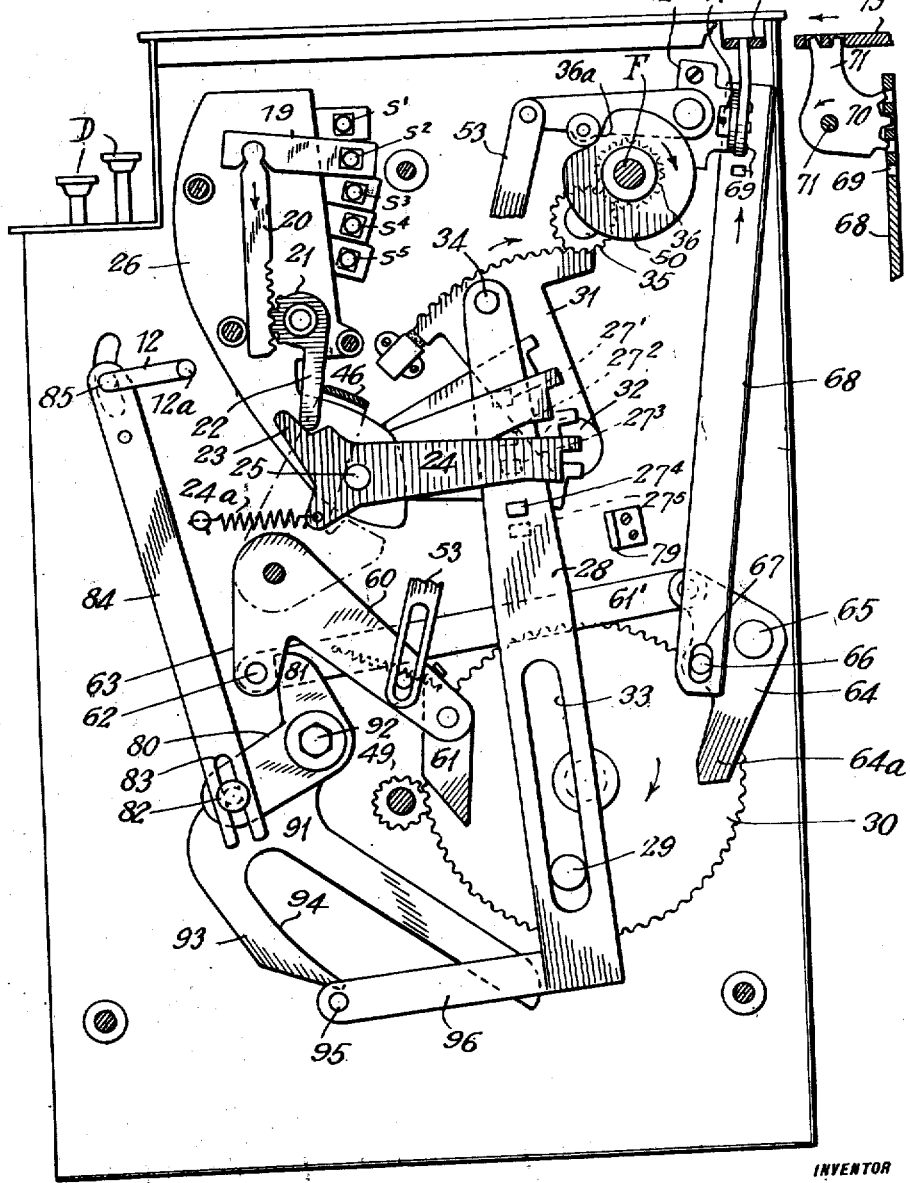

When the kick-off lever 60 is actuated, as above described, it also swings the end 64ᵃ of the bell crank 64 into the path of the crank pin 29, and when the crank pin strikes this portion of the bell crank it rocks it counter-clockwise and opens the knife to the position shown in Fig. 6, and also restores said kick-off lever to the full line position shown in Figs. 1 and 2. This completes one cycle of operations as far as the kick-off lever and knife are concerned, but while this takes place several other functions are being performed by the kick-off lever and other parts of the mechanism.

It is to be noted that when the crank pin 29 is swinging the link 28 about its selected fulcrum in a direction to drive the sector 31 clockwise, that the clutches on the shaft F are in engagement with the drums E and therefore the ticket strip T fed out into position to subsequently be acted on by the knife. When the crank pin 29 swings the link 28 in the opposite direction to oscillate the sector 31 counter-clockwise, the clutches are disengaged by mechanism to be presently described.

During clockwise or feeding movements of the sector 31 the link 28 is fulcrumed on a selected one of the swinging stops 24 co-operating with one of the several fulcrum pins 27; but during the opposite movement of the sector the link always fulcrums about the fixed bracket 79 which is positioned to co-operate with the lower fulcrum pin 27ᵇ.

For disengaging the clutches 2 from the drums during the backward movement of the sector 31, I employ a bell-crank 80, the arm 81 of which is engaged by the stud 62 of the kick-off lever 60. The upward movement of the kick-off lever is effected after the drum has fed out the selected number of tickets and at this time the lever 80 is rocked clockwise, causing its stud 82 to engage the end of a slot 83 in a bar 84, the upper end of which is connected at 85 to the bale 12 pivoted at 12ᵃ. This bale, as described in the earlier part of the specification, underlies the plate 10 and it will be recalled that when a key is depressed this plate is swung down about the shaft 11 and into contact with the bale 12, causing the movement of slide 8 and engagement of the clutch 2 with its corresponding drum E. Now when the kick-off lever rocks the stud 82 upward, the bale 12 will be lifted to the dotted position shown in Fig. 4, thereby disengaging the clutches and thus permitting the sector 31 to rotate the shaft F counter-clockwise without effecting any movement of the drums E.

I have provided improved means for positively stopping the feed drums at a determined position to insure that the ticket strip T will be severed at the correct location by the knife. These means include a movable stop 86 (Fig. 4) pivoted at 87 and having a downwardly extending arm 88. This arm is connected by a link 89 to an arm 90 of a swinging member 91 pivoted on the stud 92 which also serves as a pivot for the bell crank 80. The member 91 has a curved arm 93 the inner cam surface 94 of which is shaped to coact with a pin 95 (Fig. 2) carried by an extension 96 of the connecting element on link 28. The member 91 is so located and the surface 94 is so plotted or shaped that the pin 95 will strike and rock said member after the lapse of determined time intervals from the time that the drum starts to move in feeding the ticket strip. For example if the number one key is depressed to issue one ticket the pin 95 will strike the surface 94 at a point near the free end of the arm 93 and the stop 86 will swing in and engage one of the feed pins e of the drum E after one ticket has been issued. When another key is depressed, say the one calling for five tickets, the link 28 will rock on a different fulcrum and the pin 95 will have to travel a greater distance before it engages the surface 94 and in this instance it will strike said surface at a point much nearer the center of oscillation 92 of the member 91. This gives the drum time enough to feed out a strip corresponding to the length of five tickets, after which the stop 86 is swung in to engage one of the feed pins e of the drum. In a similar manner the stop 86 will move in at the proper time to positively stop the drum after the issuance of any selected number of tickets.

A spring pressed pawl 97 pivoted at 98 is also provided to prevent backward or counter-clockwise rotation of the drum, this pawl also coacting with the feed pins e carried by the feed drum.

To prevent the drum from being turned forward or clockwise when the clutches are out of engagement with the drums, I provide a latch 99 (Figs. 4, 6 and 7) pivoted to a fixed bracket at 100 and having an arm 101 the end of which engages a slot 102 formed in an ear 103 on the clutch lever 3. When the clutch is out of engagement with the drum the latch 99 is in front of a feed pin e and therefore positively prevents the forward rotation of the drum. The drum is therefore locked against rotation in either direction at this time by the latch 99 and the pawl 97. When a key is depressed the clutch lever 3 will rock the latch 99 out of the path of the pins e and permit the drum to turn through the angular distance corresponding to the key operated, as will be understood.

The arrangement, construction and functions of the several elements, having been above described it is only now necessary to give a brief general description of the operation to enable those skilled in the art to understand the invention.

The ticket strip T is initially threaded around the drum E, the pins e of which engage suitable feed holes t formed in the strip. The strip T may be fed either from a continuous role or from a continuous stack folded zig-zag fashion and held in a suitable receptacle.

To issue a ticket the operator depresses a button in the group corresponding to the denomination required, the particular key selected in the desired denomination corresponding to the number of such tickets wanted. Pressing the key causes one of the fingers 22 (Figs. 1 and 2) to rock the lever 45 which in turn moves the switch blade 41 and closes the motor circuit through contacts 37 and 38. This causes the main drive gear 30 and crank pin 29 to move and carry link 28 to position of Fig. 2, where one of the fulcrum pins 27 engages the notched end of the selected stop 24 released by the key. The crank pin 29 will now rock the link about the fulcrum 27 and rock the sector 31 clockwise and cause the drum shaft F to rotate. Depression of the key also caused the latch 99 to be released from the drum and the clutch to engage the drum. The rocking of the shaft F causes the cam 50 to lift the link 53, close the motor circuit through contacts 39 and 40, and lift the kick-off lever 60 into the dotted position of Fig. 2. The crank pin 29 then comes around into engagement with the kick-off lever 60 after the sector has had time to make its maximum stroke to issue the greatest number of tickets. The link 61 then moves to the right lifting the bar 68 and through sector 70, and bar 73 operates the knife to sever the issued ticket or tickets from the strip T. The kick-off lever strikes the pin 44 and rocks the lever 45 and restores the fingers 22, stops 24 and keys to normal position. This lever 60 also rocks the bell crank 80 and through link 84 and bale 12 restores the plate 10 to its upper position and disengages the clutches from the drums. During this time the member 91 has also been rocked to cause the movable stop 86 to positively stop the drum in set position after the desired number of tickets have been issued. The link 28 is now rocked about the fulcrum pin 27[5] which at this time engages the stop 79 to rock the sector 31 back to its normal position shown in Fig. 1. The cam 36 is then turned back so the notch 36[a] comes opposite the roller on lever 51. The crank pin 29 now strikes the arm 64[a] and through link 61' restores the kick-off lever to the full line positions of Figs. 1 and 2. This completes the cycle of operations and cuts off the current from the motor, the down stroke of the kick-off lever pulling down links 53 and 54 and breaking the circuit across the contacts 39 and 40. This leaves the parts in the positions shown in Figs. 1, 3 and 4 ready to again go through the above cycle of operations upon the depression of one of the keys.

As changes of construction could be made within the scope of my invention, it is intended that all matter contained in the above description or shown in the accompanying drawings shall be interpreted as illustrative and not in a limiting sense.

Having thus described my invention what I claim as new and desire to secure by Letters Patent is:—

1. A ticket issuing machine including in combination a plurality of ticket feed drums, a common shaft associated operatively with each of said drums, clutches movable with said shaft, means for engaging said clutches with said drums, means for operating said clutch engaging means, and a plurality of groups of keys corresponding to each drum so arranged that any key in any group can operate the clutch engaging means of the corresponding drum in its respective group.

2. A ticket issuing machine including in combination a plurality of ticket feed drums, a common shaft associated operatively with each of said drums, clutches movable with said shaft, means for engaging said clutches with said drums, means for operating said clutch engaging means, and a plurality of groups of keys corresponding to each drum so arranged that any key in any group can operate the clutch engaging means of the corresponding drum in its respective group, and means controlled by said keys for determining the extent of movement of said drum to vary the number of tickets to be issued.

3. A ticket issuing machine including in combination, a ticket feed drum, a drum shaft operatively associated with said drum, a clutch movable with said drum, a group of keys for determining the extent of movement of said drum, a member operable by any key in said group for moving said clutch into engagement with the drum, a plurality of shafts actuated by said keys, a plurality of swinging stops operatively connected with said shafts, a main driving gear having a crank pin, an oscillating sector geared to said drum shaft, a link pivoted to said sector and having a slot engaging said crank pin and a plurality of fulcrum lugs adapted to engage a selected one of said swinging stops to vary the stroke of said sector to control the extent of movement of the feed drum.

4. In a ticket issuing machine, a group of keys, shafts rocked by said keys, swinging fingers operatively connected with said shafts, a starting switch arm having a lip engaging said fingers, a switch blade movable with the starting switch arm for closing an electric circuit when a key is depressed.

5. In a ticket issuing machine a group of keys, shafts rocked by said keys, swinging fingers operatively connected with said shafts, a starting switch arm having a lip engaging said fingers, a switch blade movable with the starting switch arm and a motor whose circuit is initially made by said switch blade when a key is depressed, a main drive gear driven by said motor, a crank pin on said main drive gear, an oscillating sector, a connecting element actuated by said crank pin for driving said sector and having a plurality of fulcrum lugs thereon, swinging stops actuated by said fingers to bring a selected stop into position to engage one of said fulcrum lugs, a drum shaft driven by said sector, a cam on said shaft and a lever operated thereby, a kick-off lever connected by a link with said cam operated lever and adapted to be moved thereby into the path of said crank pin and a cut-off switch blade moved into and out of operative position by said link.

6. In a ticket issuing machine a ticket feed drum, a drum shaft, a fixed stroke driving member, a member associated therewith for driving said drum shaft, a fulcrumed connecting element between said member and said fixed stroke driving member, and means for shifting the fulcrum of said connecting element to vary the movement transmitted thereby.

7. In a ticket issuing machine, a ticket feed drum, a drum shaft, a fixed stroke driving member, a member associated therewith for driving said drum shaft, a fulcrumed connecting element between said member and said fixed stroke driving member, keys, swinging stops actuated by said keys arranged to co-act with said connecting element to shift its fulcrum and vary the movement transmitted by said connecting element.

8. In a ticket issuing machine, a feed drum having a plurality of ticket engaging feed pins, a drum shaft therefor, a clutch movable with said shaft, means for engaging said clutch with the feed drum, and means operable by said last named means for preventing the feeding movement of said drum when said clutch is out of engagement with the feed drum.

9. In a ticket issuing machine, a ticket feed drum, a drum shaft, a fixed stroke driving member, a member associated therewith for driving said drum shaft, a connecting element between said member and said fixed stroke driving member and means for varying the movement transmitted by said connecting element, a clutch movable with said drum shaft, means operable by said keys for engaging said clutch with said drum shaft and means for preventing the feeding movement of said drum when the clutch is out of engagement with said drum.

10. In a ticket issuing machine, a ticket feed drum, a drum shaft, a fixed stroke driving member, a member associated therewith for driving said drum shaft, a connecting element between said member and said fixed stroke driving member and means for varying the movement transmitted by said connecting element, a movable stop actuated by said connecting element for positively stopping the movement of said drum after a selected number of tickets have been issued.

11. In a ticket issuing machine, a ticket feed drum, a drum shaft, a fixed stroke driving member, a member associated therewith for driving said drum shaft, a connecting element between said member and said fixed stroke driving member and means for varying the movement transmitted by said connecting element, a movable stop, a swinging lever having a cam surface arranged to be engaged at different points by a pin on said connecting element to positively stop the movement of said drum after a selected number of tickets have been issued, and means for transmitting the movement of said swinging lever to said movable stop.

12. In a ticket issuing machine, a ticket feed drum, a drum shaft, a fixed stroke driving member, a member associated therewith for driving said drum shaft, a connecting element between said member and said fixed stroke driving member and means for varying the movement transmitted by said connecting element, a movable stop, a swinging lever having a cam surface arranged to be engaged at different points by a pin on said connecting element to positively stop the movement of said drum after a selected number of tickets have been issued, and means for transmitting the movement of said swinging lever to said movable stop, and an arm on said swinging lever for subsequently breaking the engagement between the movable stop and the drum.

13. In a ticket issuing machine, a feed drum having a plurality of ticket engaging feed pins, a drum shaft therefor, a clutch movable with said shaft, means for engaging said clutch with the feed drum and means operable by said last named means for preventing the feeding movement of said drum when said clutch is out of engagement with the feed drum, a movable stop coacting with said feed pins for positively stopping the movement of said drum after a selected number of tickets have been issued.

14. In a ticket issuing machine, a feed drum having a plurality of ticket engaging feed pins, a drum shaft therefor, a clutch movable with said shaft, means for engaging said clutch with the feed drum and means operable by said last named means for preventing the feeding movement of said drum when said clutch is out of engagement with the feed drum, a movable stop arranged to coact with said drum, and a member for moving said stop having a cam surface arranged to coact with said connecting element to positively stop the movement of said drum after a selected number of tickets have been issued.

15. In a ticket issuing machine, a ticket feed drum, a drum shaft, a clutch for engaging the drum with the drum shaft, key actuated means for moving said clutch into engagement with the drum, a main drive gear, an oscillating member for driving said drum shaft, a connecting element between said main drive gear and said oscillating member, key actuated members for varying the motion transmitted by said connecting element and means actuated by said main drive gear for disengaging said clutch after a predetermined number of tickets have been issued.

16. In a ticket issuing machine, a ticket feed drum, a drum shaft, a clutch for engaging the drum with the drum shaft, a key actuated means for moving said clutch into engagement with the drum, a main drive gear, an oscillating member for driving said drum shaft, a connecting element between said main drive gear and said oscillating member, key actuated members for varying the motion transmitted by said connecting element and means actuated by said main drive gear for disengaging said clutch after a predetermined number of tickets have been issued, and a knife actuated by said main drive gear for severing the issued tickets.

17. In a ticket issuing machine, a ticket feed drum, a drum shaft, a clutch for engaging the drum with the drum shaft, key actuated means for moving said clutch into engagement with the drum, a main drive gear, an oscillating member for driving said drum shaft, a connecting element between said main drive gear and said oscillating member, key actuated members for varying the motion transmitted by said connecting element and means actuated by said main drive gear for disengaging said clutch after a predetermined number of tickets have been issued, a swinging knife for severing the issued tickets, a reciprocating bar for actuating said knife, a kick-off lever actuated by said driving gear, connections between said kick-off lever and said reciprocating bar for moving it in cutting direction, and means actuated by said main drive gear for moving said bar in the opposite direction.

In witness whereof I have hereunto set my hand at the city, county and State of New York, this 31st day of December, 1920.

REUBEN H. HELSEL.